(12) United States Patent (10) Patent No.: US 12,565,320 B2

Murray (45) Date of Patent: Mar. 3, 2026

(54) AIR PRESSURISATION SYSTEM

(71) Applicant: ROLLS-ROYCE plc, London (GB)

(72) Inventor: Christopher A. Murray, Nottingham (GB)

(73) Assignee: Rolls-Royce PLC, London (GB)

( * ) Notice: Subject to any disclaimer, the term of this patent is extended or adjusted under 35 U.S.C. 154(b) by 46 days.

(21) Appl. No.: 18/795,552

(22) Filed: Aug. 6, 2024

(65) Prior Publication Data

US 2025/0066024 A1 Feb. 27, 2025

(30) Foreign Application Priority Data

Aug. 21, 2023 (GB) ..................................... 2312722

(51) Int. Cl.
| | |
|---|---|
| *F16H 3/72* | (2006.01) |
| *B64D 13/02* | (2006.01) |
| *F01D 15/10* | (2006.01) |
| *F01D 21/00* | (2006.01) |
| *F02C 7/32* | (2006.01) |

(52) U.S. Cl.
CPC ............. B64D 13/02 (2013.01); F01D 15/10 (2013.01); F01D 21/006 (2013.01); F02C 7/32 (2013.01); F16H 3/72 (2013.01); *F05D 2260/40311* (2013.01); *F16H 2200/2005* (2013.01); *F16H 2200/2033* (2013.01)

(58) Field of Classification Search
CPC . F16H 3/72; F16H 3/724; F16H 3/725; F16H 3/727; F16H 2200/2005; F16H 2200/2033; B64D 13/02; F02C 7/32; F02C 7/275; F02C 7/36; F05D 2260/40311

USPC ....................................... 475/5, 22, 317, 323
See application file for complete search history.

(56) References Cited

U.S. PATENT DOCUMENTS

| | | | |
|---|---|---|---|
| 10,371,059 B2 | 8/2019 | Knight et al. | |
| 2011/0256973 A1* | 10/2011 | Werner .................. | B60K 6/445 |
| | | | 475/5 |
| 2017/0233080 A1 | 8/2017 | Knight et al. | |

(Continued)

FOREIGN PATENT DOCUMENTS

| | | |
|---|---|---|
| EP | 3517436 A1 | 7/2019 |
| EP | 3517436 B1 | 5/2020 |

(Continued)

OTHER PUBLICATIONS

Great Britain search report dated Jan. 22, 2024, issued in GB Patent Application No. 2312722.8.

(Continued)

*Primary Examiner* — Roger L Pang

(57) ABSTRACT

There is provided an air pressurisation system for an aircraft, the air pressurisation system comprising: a transmission for driving a rotor of a blower compressor for the air pressurisation system, wherein the transmission comprises: a first input configured to receive drive from a spool of a gas turbine engine; a second input; and an output configured to drive to the rotor of the blower compressor, wherein a speed of the output is determined by a function of speeds of the first and second inputs; and a brake coupled to the second input, wherein the brake is operable to engage and brake the transmission at the second input, in order to fix a transmission ratio of the transmission between the first input and the output.

16 Claims, 7 Drawing Sheets

(56)  References Cited

U.S. PATENT DOCUMENTS

| | | | | |
|---|---|---|---|---|
| 2018/0126836 A1* | 5/2018 | Waldner | .................. | F03D 15/00 |
| 2018/0149091 A1* | 5/2018 | Howell | .................. | B64D 27/12 |
| 2019/0366832 A1* | 12/2019 | Weeramantry | ......... | B60K 6/365 |
| 2020/0102885 A1* | 4/2020 | Kupratis | .................... | F02C 7/32 |
| 2021/0362859 A1* | 11/2021 | Willshee | ................. | F02C 7/275 |
| 2022/0355939 A1 | 11/2022 | Eryilmaz et al. | | |
| 2023/0212985 A1 | 7/2023 | Kupratis et al. | | |

FOREIGN PATENT DOCUMENTS

| | | | |
|---|---|---|---|
| EP | 3517437 B1 | 5/2020 | |
| EP | 3517438 B1 | 6/2020 | |
| EP | 3912912 A1 | 11/2021 | |

OTHER PUBLICATIONS

European search report dated Jan. 7, 2025, issued in EP Patent Application No. 24189952.5.

* cited by examiner

AIR PRESSURISATION SYSTEM

CROSS-REFERENCE TO RELATED APPLICATIONS

This specification is based upon and claims the benefit of priority from United Kingdom Patent Application No. 2312722.8, filed on 21 Aug. 2023, the entire contents of which are incorporated herein by reference.

BACKGROUND

Technical Field

The present disclosure relates to air pressurisation systems for providing air to an airframe system, particularly a cabin pressurisation system. The present disclosure also concerns an aircraft comprising an airframe, a gas turbine engine and an air pressurisation system.

Description of the Related Art

It is known to pressurise a cabin of an aircraft using an air pressurisation system which makes use of engine bleed air which is bled from a compressor section of the core of a gas turbine engine. Bleeding high pressure air from the gas turbine engine reduces its efficiency and thereby increases its fuel consumption.

It is therefore desirable to provide an improved air pressurisation system. Air pressurisation systems which make use of air which is taken from a lower pressure source of a gas turbine engine, such as a bypass duct, and which subsequently compress the air prior to delivering it to the cabin are also known. Some exemplary air pressurisation systems are described in EP3517436 B1, EP3517437 B1 and EP3517438 B1.

SUMMARY

According to an aspect of the present disclosure, there is provided an air pressurisation system for an aircraft, the air pressurisation system comprising:
a transmission for driving a rotor of a blower compressor for the air pressurisation system, wherein the transmission comprises: a first input configured to receive drive from a spool of a gas turbine engine; a second input; and an output configured to drive to the rotor of the blower compressor, wherein a speed of the output is determined by a function of speeds of the first and second inputs; and a brake coupled to the second input, wherein the brake is operable to engage and brake the transmission at the second input, in order to fix a transmission ratio of the transmission between the first input and the output.

The brake may be selectively operable to brake the transmission at the second input. Additionally or alternatively, the brake may be configured to engage and brake the transmission at the second input when a speed of the transmission at the second input exceeds a predetermined threshold speed. For example, the brake may comprise a passive centrifugal brake.

The brake may be configured to disengage, so that the second input is not braked by the brake, when a speed of the transmission at the second input reduces below a further predetermined threshold speed.

The transmission may comprise a differential epicyclic transmission. The first input may be operatively coupled to one of a ring gear and a carrier of the differential epicyclic transmission. The second input may be operatively coupled to the other of the ring gear and the carrier. The output may be operatively coupled to a sun gear of the differential epicyclic transmission.

The other of the ring gear and the carrier may comprise a stepped gear. The brake may be meshing engaged with a step of the other of the ring gear and the carrier having a fewer number of teeth than the other step, e.g. with which the planet gear or a variator spur gear is meshingly engaged.

The system may further comprise an electrical machine. A shaft of the electrical machine may be operatively coupled to the second input. The system may further comprise an electrical power management system configured to control a speed of the shaft of the electrical machine. The system may further comprise a further electrical machine. A shaft of the further electrical machine may be drivingly coupled with the spool of the gas turbine engine. The further electrical machine may be electrically coupled to the electrical power management system.

The system may further comprise a controller configured to identify a fault in the further electrical machine. The controller may be configured to operate the brake to engage and brake the transmission at the second input, when a fault is identified in the second electrical machine.

The system may be configured to operate in a starter mode, in which the transmission is configured to receive drive from a rotor of the blower compressor at the output and supply drive to the spool of the gas turbine engine via the first input. When operating in the starter mode, the brake may be configured to engage in order to fix a transmission ratio of the transmission.

The brake may be selectively operable to disengage from the second input, so that the second input is not braked by the brake.

The system may further comprise a further brake coupled to the second input. The further brake may be operable to engage and brake the transmission at the second input, in order to fix a transmission ratio of the transmission between the first input and the output.

The brake may be configured to engage and brake the transmission at the second input when a speed of the transmission at the second input exceeds a predetermined threshold speed. The further brake may be selectively operable to brake the transmission at the second input, e.g. when the system is operating in the starter mode.

An aircraft may comprise an airframe, a gas turbine engine and the above mentioned air pressurisation system. The blower compressor may be located within the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein. In particular, features described in relation to the air/oil separator of the first mentioned air pressurisation system may apply equally to any other air/oil separators mentioned herein.

4

DESCRIPTION OF THE DRAWINGS

Embodiments will now be described by way of example only with reference to the accompanying drawings, which are purely schematic and not to scale, and in which.

DETAILED DESCRIPTION

Figure 1:
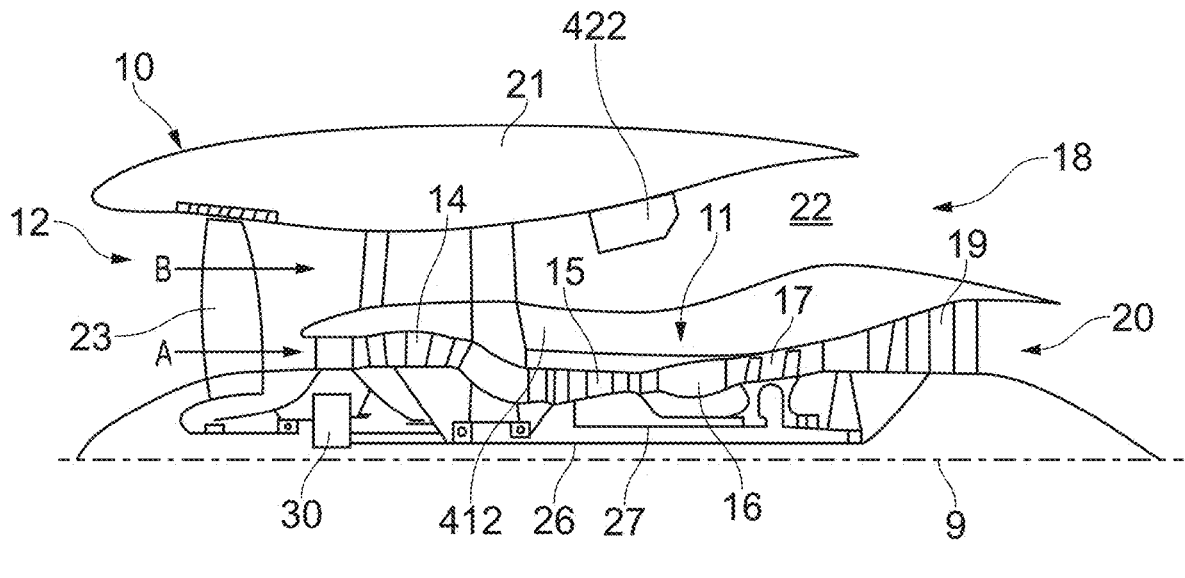
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The bypass duct 22 may comprise an engine bypass duct port 422 for supplying air from the bypass duct to an air pressurisation system or the like. The engine core 11 may also comprise an engine core port for supplying air from a compressor stage of the engine core 11 (such as the low pressure compressor 14 or the high-pressure compressor 15) to an air pressurisation system or the like. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
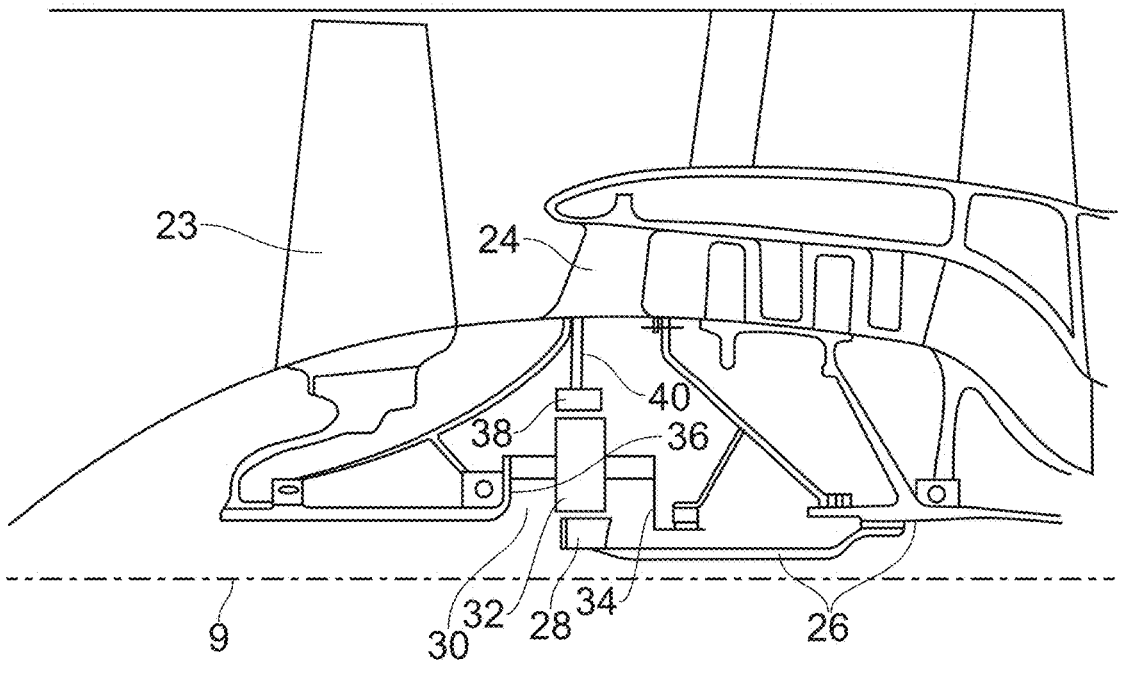
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
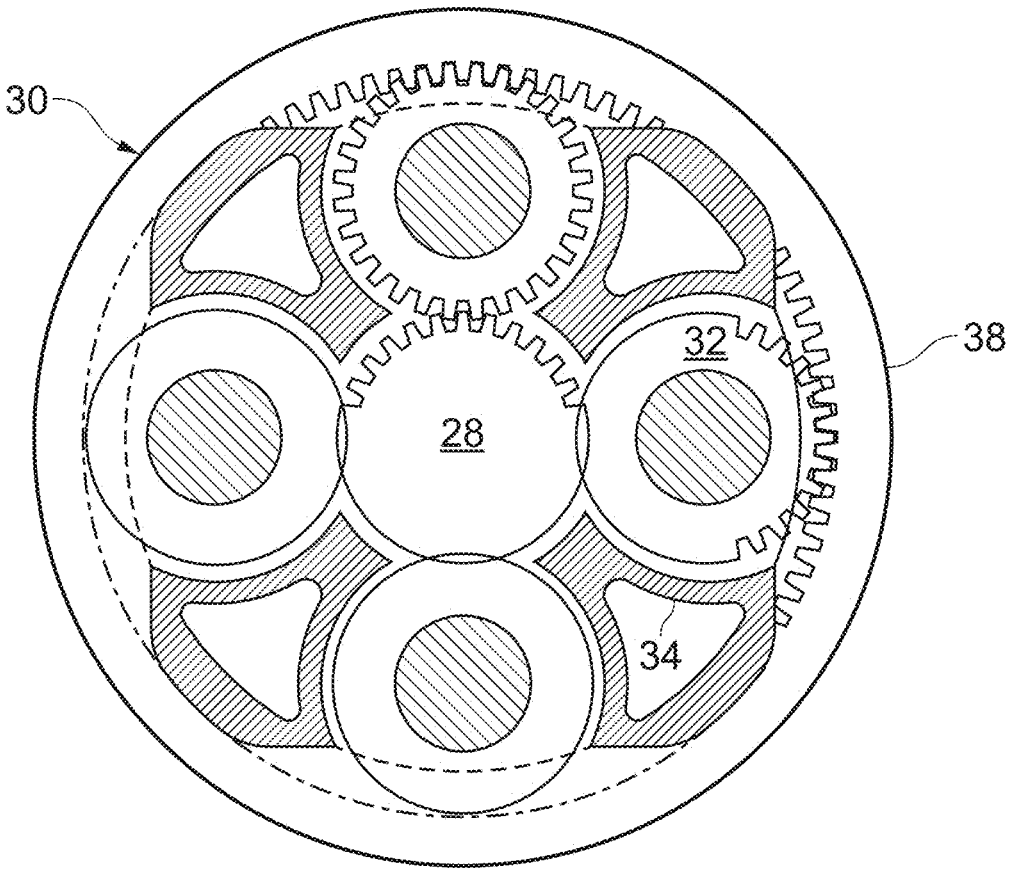
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
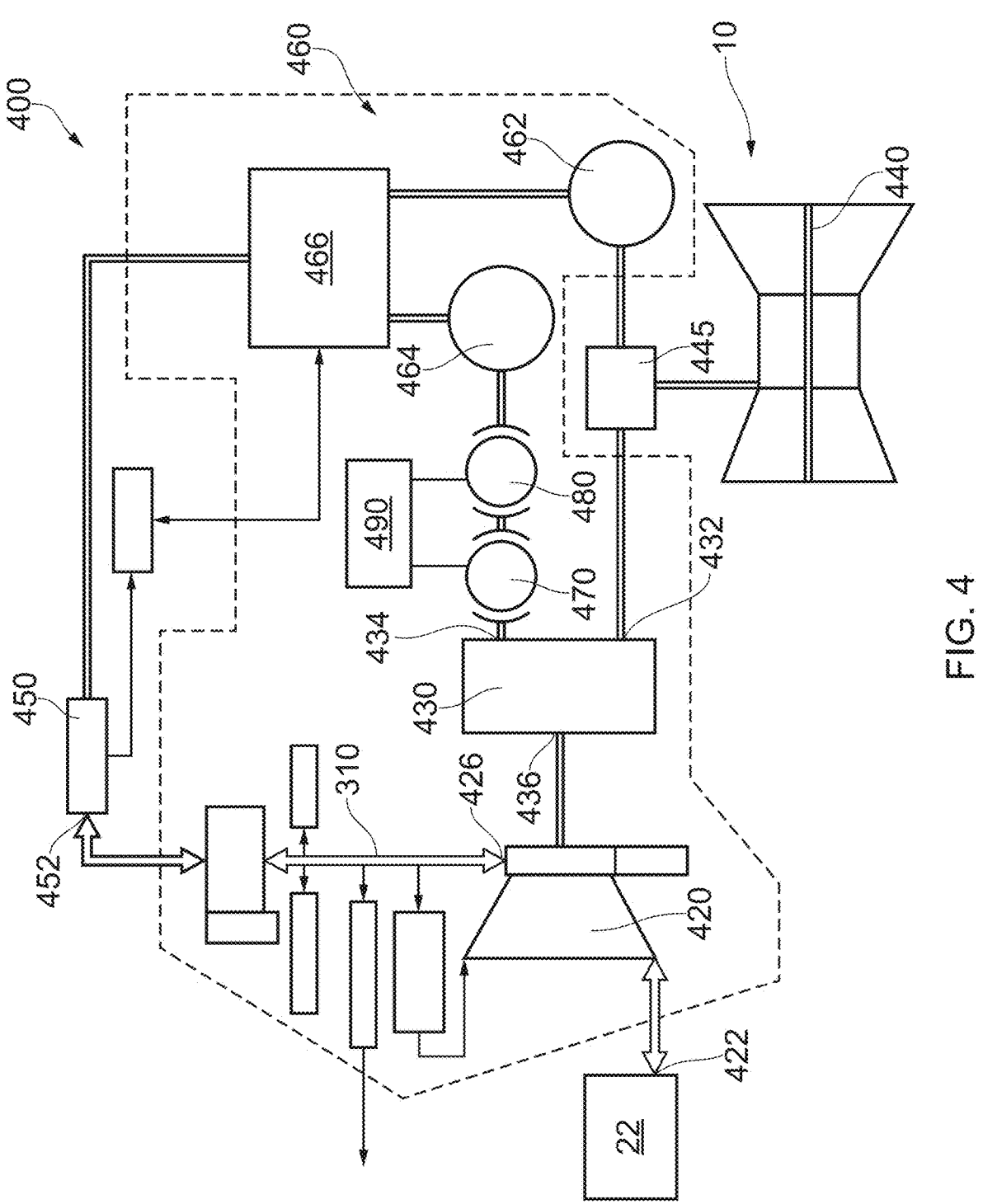
FIG. 4 is a schematic view of an air pressurisation system, according to arrangements of the present disclosure, for supplying air to an airframe system.

An air pressurisation system 400, according to arrangements of the present disclosure, for supplying air to an airframe system 450 is shown schematically in FIG. 4. The air pressurisation system 400 comprises a blower compressor 420 configured to be mechanically coupled to a spool 440 of a gas turbine engine, such as the gas turbine engine 10. The expression "spool" is used herein to denote a shaft of the engine which interconnects a compressor and a turbine of the engine core, and/or engine components which rotate together with such an engine shaft (e.g., the compressor and turbine interconnected by the shaft, and associated rotating components such as drums and disks).

The blower compressor 420 is configured to operate in a blower mode in which the blower compressor 420 is driven to rotate by the spool 440 to draw an inlet flow of gases from an engine bypass duct port 422. The engine bypass duct port 422 is in fluid communication with a bypass duct 22 of the gas turbine engine. Accordingly, when operated in the blower mode, the blower compressor 420 is configured to receive the inlet flow of air from the bypass duct 22 of the gas turbine engine. Flows of gases referred to within the present specification, such as the inlet flow of gases and the compressed gases discharged from the blower compressor may be, or be substantially comprised of, compressed air. Unless otherwise specified, the terms "flows of gases" and "flows of air" may be used interchangeably herein. It will be appreciated that when a flow of gases is referred to as a flow of air, then the flow may additionally comprise one or more other gases, e.g. contaminants, such as oil, oil mist, volatile organic compounds, burnt and unburnt hydrocarbons and/or any other contaminants present within the flow of air/gases.

The blower compressor 420 is configured to discharge compressed gases to a blower compressor discharge port 426 for supply to an airframe port 452 for an airframe air use (i.e., a particular application or purpose for which the air is supplied to the airframe). A delivery line 310 extends from the blower compressor discharge port 426 to the airframe port 452. The airframe port 452 is in, or configured to be in, fluid communication with the airframe system 450. The airframe air use may be, for example, one or more of wing anti-icing, fuel tank inerting, cargo bay smoke eradication aircraft cabin pressurisation or cargo bay smoke eradication.

The blower compressor 420 is generally configured to compress the inlet flow of air by converting kinetic energy of the inlet flow of air into pressure energy and heat energy. The blower compressor 420 may be any suitable type of compressor. As shown in the FIG. 4, the blower compressor 420 may preferably be a centrifugal compressor.

The air pressurisation system 400 further comprises a variable transmission 430 for mechanically coupling the blower compressor 420 to the spool 440. The variable transmission 430 allows a rotational speed of the blower compressor 420 to be decoupled from a rotational speed of the spool 440, so that a performance of the air pressurisation system 400 is not solely governed by an operating speed of the gas turbine engine (e.g., it can be controlled to operate at a target speed independent of the rotational speed of the spool, and/or at a variable speed ratio relative to the rotational speed of the spool). Inclusion of a variable transmission 430 within the air pressurisation system 400 therefore provides more versatile and adaptable means for supplying pressurised air to an airframe system. Various suitable variable transmission types will be apparent to those of ordinary skill in the art.

The variable transmission 430 comprises a first input 432 configured to receive drive from the spool 440 of the gas turbine engine. The gas turbine engine may comprise an accessory gearbox 445 coupled to the spool 440, and the variable transmission 430 may be coupled to the spool 440 via the accessory gearbox 445.

As depicted, the air pressurisation system 400 may further comprise an electrical variator 460 for varying the speed of an output 436 of the variable transmission 430 relative to the speed of the input provided to the first input 432, e.g., from the spool 440. The electrical variator 460 may comprise a first electrical machine 462, a second electrical machine 464 and an electrical power management system 466 operatively coupled to the first and second electrical machines 462, 464. The first electrical machine 462 may be a motor-generator and may be operatively coupled to the spool 440. In particular, a shaft of the first electrical machine 462 may be operatively coupled to the accessory gearbox 445. When the blower compressor 420 is operating in the blower mode, the first electrical machine 462 may be operated as a generator to convert mechanical power received from the spool 440 to electrical power. The second electrical machine 464 may be operated as a motor, and may receive at least a portion of the electrical power generated by the first electrical machine via the electrical power management system 466.

The variable transmission 430 further comprises a second input 434. The second input may be configured to receive drive from the second electrical machine 464. For example, a shaft of the second electrical machine may be operatively coupled to the second input. The second electrical machine 464 may be operable by the electrical power management system 466 to drive the variable transmission 430, e.g. the second input of the variable transmission, in either direction.

The variable transmission 430 may be a summing transmission configured such that the speed of the output 436 from the variable transmission 430 is the sum of the speeds of the first and second inputs 432, 434. Alternatively, the variable transmission may be configured such that the speed of an output 436 varies based on the speeds of the first and second inputs 432, 434 in any other way.

The electrical power management system 466 may be configured to control the operation of the second electrical machine 464, e.g. the power supplied to the second electrical machine, in order to control the speed of the output 436. The power management system 466 may be configured to provide a continuously-variable difference between the power received from the first electrical machine 462 and the power output to the second electrical machine 464. The power management system 466 may include electrical storage, in the form for example of one or more batteries, capacitors or similar, that enables the power management system to output a different, e.g. less or more, power than is being received by the power management system at any particular moment. The electrical power management system 466 may also be configured to control the direction of rotation of the second electrical machine. By varying the speed, direction and power of the second electrical machine 464, the power management system may be configured to control the speed and power supply from the output of the variable transmission 430 to the blower compressor 420.

In the arrangement depicted in FIG. 4, the variable transmission 430 comprises a differential epicyclic transmission. However, in other arrangements, the variable transmission may comprise any other kind of variable transmission.

In addition to operating in the blower mode, the air pressurisation system 400 can also be operated in a starter mode in which the blower compressor 420 can operate in reverse as an expander to provide drive to the variable transmission 430 and thereby provide mechanical input to the gas turbine engine 10 to facilitate a start operation of the gas turbine engine.

When the air pressurisation system 400 is operating in the starter mode, the second electrical machine 464 can be held stationary, such that the variable transmission 430 transmits the mechanical power from the compressor 420 to the spool 440, e.g. via the accessory gearbox 445, to facilitate starting of the gas turbine engine. The remaining steps required for the successful ignition of a gas turbine engine will be known to the person skilled in the art and are therefore not discussed in the present disclosure.

In some arrangements, in the starter mode, the first electrical machine 462, may be operated as a motor and may receive power from the power management system 466. The power received by the first electrical machine 462 may be generated by the second electrical machine 464 operating as a generator, e.g. receiving mechanical power from the blower compressor 420 via the transmission 430. The mechanical power generated by the first electrical machine 462 may be added to that transmitted through the transmission 430 from the blower compressor 420, for driving rotation of the accessory gearbox 445 and thus the spool 440.

During operation of the air pressurisation system 400 in the blower mode, a fault or failure of the electrical variator 460, such as a bearing failure of the first electrical machine 462 resulting in a rotor of the first electrical machine seizing, may result is a rapid change, e.g., fall, in torque being supplied by the second electrical machine 464 to the variable transmission 430 without any change in torque supplied by the spool 440, e.g., via the accessory gearbox 445. In such circumstances, the second input 434 of the variable transmission and/or the second electrical machine 464 may be driven to overspeed. In a similar way, when the air pressurisation system 400 is operating in the starter mode, a fault in the electrical variator 460 and/or in the pneumatic-mechanical systems of the air pressurisation system 400 may cause the second electrical machine 464 to accelerate, e.g., from stationary. For example, a pneumatic-mechanical fault may cause the second electrical machine to accelerate before the electrical variator 460 is able to supply power to the second electrical machine for the second electrical machine 464 to produce a suitable torque to prevent the acceleration.

As depicted in FIG. 4, the air pressurisation system 400 further comprises a brake 470 coupled to the second input 434 of the variable transmission. The brake 470 is operable to engage and brake the variable transmission 430 at the second input, in order to fix a transmission ratio of the variable transmission 430 between the first input 432 and the output 436. When the brake 470 is engaged, a power supplied from the output 436 may be substantially equal to a power input from the accessory gearbox 445 at the first input 432, and vice versa. Additionally, a ratio of speeds between the output 436 and first input 432 may be fixed, e.g., based on the configuration of the variable transmission 430.

The brake 470 may be a passively operated brake. For example, the brake may be configured to engage, e.g., automatically engage, when a speed of the variable transmission at the second input 434 and/or the output 436 exceeds a predetermined threshold speed. In one or more arrangements, the brake 470 may be a passive centrifugal brake comprising a brake shoe configure to move outwardly by virtue of rotation of the brake 470 and engage a brake surface when the speed of rotation of the brake is greater than or equal to a predetermined threshold speed.

The brake 470 may be configured to remain engaged after the brake has initially become engaged, so as to continue braking the variable transmission 430 at the second input 434. Alternatively, the brake 470 may be configured to disengage, so that the second input 434 is not, e.g., no longer, braked by the brake 470, when a speed of the transmission at the second input, or the shaft of the second electrical machine, reduces below a further predetermined threshold speed. Additionally or alternatively, the brake 470 may be operable to disengage from the second input 434, so that the second input is not braked by the brake. In other words, the brake 460 may be selectively disengageable.

When the air pressurisation system 400 is operating in the starter mode, the brake 470 may be configured to engage and brake the variable transmission 430 at the second input 434, in order to fix the transmission ratio of the variable transmission and cause the power, e.g., the total power, supplied by the blower compressor 420 to be output to the spool 440, e.g. via the first input 432 and the accessory gear box 445.

The air pressurisation system 400 may comprise a brake controller 490 configured to control the operation of the brake 470. The brake controller 490 may be configured to determine a speed of rotation of the variable transmission 430, e.g., of the second input 434, and control the operation of the brake 470 based on the determined speed of rotation. For example, the brake controller 490 may be configured to operate the brake 470 to engage if the speed of rotation is greater than the predetermined threshold speed. Additionally or alternatively, the brake controller 490 may be configured to operate the brake 470 to disengage if the speed of rotation is less than the further predetermined threshold speed. In some arrangements, the brake controller 490 may be configured to detect a fault with the air pressurisation system 400, such as with the first electrical machine 462, which may result in over speeding of the second input 434 of the variable transmission. The brake controller 490 may be configured to operate the brake 470 to engage if a fault is detected with the air pressurisation system, e.g. the first electrical machine. In a similar way, the brake controller 490 may be configured to determine when the fault is resolved, for example, following a maintenance operation being carried out on the air pressurisation system, and may operate the brake 470 to disengage once it has been determined that the fault has been resolved.

The air pressurisation system 400 may comprise a further brake 480. The further brake may similarly be engageable with the second input 434 of the variable transmission to selectively brake the variable transmission at the second input 434. In particular, the further brake 480 may be controllable to brake the variable transmission when the air pressurisation system 400 is operating in the starter mode. The brake controller 490 may be configured to operate the further brake 480 to engage when the engine is being started. The brake controller 490 may be configured to operate the further brake to disengage once the engine has been started.

In some arrangements, the brake controller 490 may additionally be configured to control the operation of the further brake 480 in the manner described above in relation to the brake 470, in addition to or as an alternative to controlling the operation of the brake 470. For example, the brake controller 490 may be configured to control the further brake 480 to engage and brake the second input 434 of the variable transmission when a fault is detected with the air pressurisation system, e.g. a component of the electrical variator 460, such as the first electrical machine and/or when a speed of rotation of the variable transmission 430, e.g. of the second input 434, it determined to be above the threshold speed.

In the arrangement shown in FIG. 4, the air pressurisation system 400 comprises the brake 470 and the further brake 480. However in other arrangements, the brake 470 or further brake 480 may be omitted. Further, in the arrangement shown in FIG. 4, the brake and further brake are coupled to the second input 434 in series with one another and with the second electrical machine. However, in other arrangements, the brake and further brake may be coupled to the second input 434 is parallel with one another and/or with the second electrical machine 464.

Figures 5A, 5B:
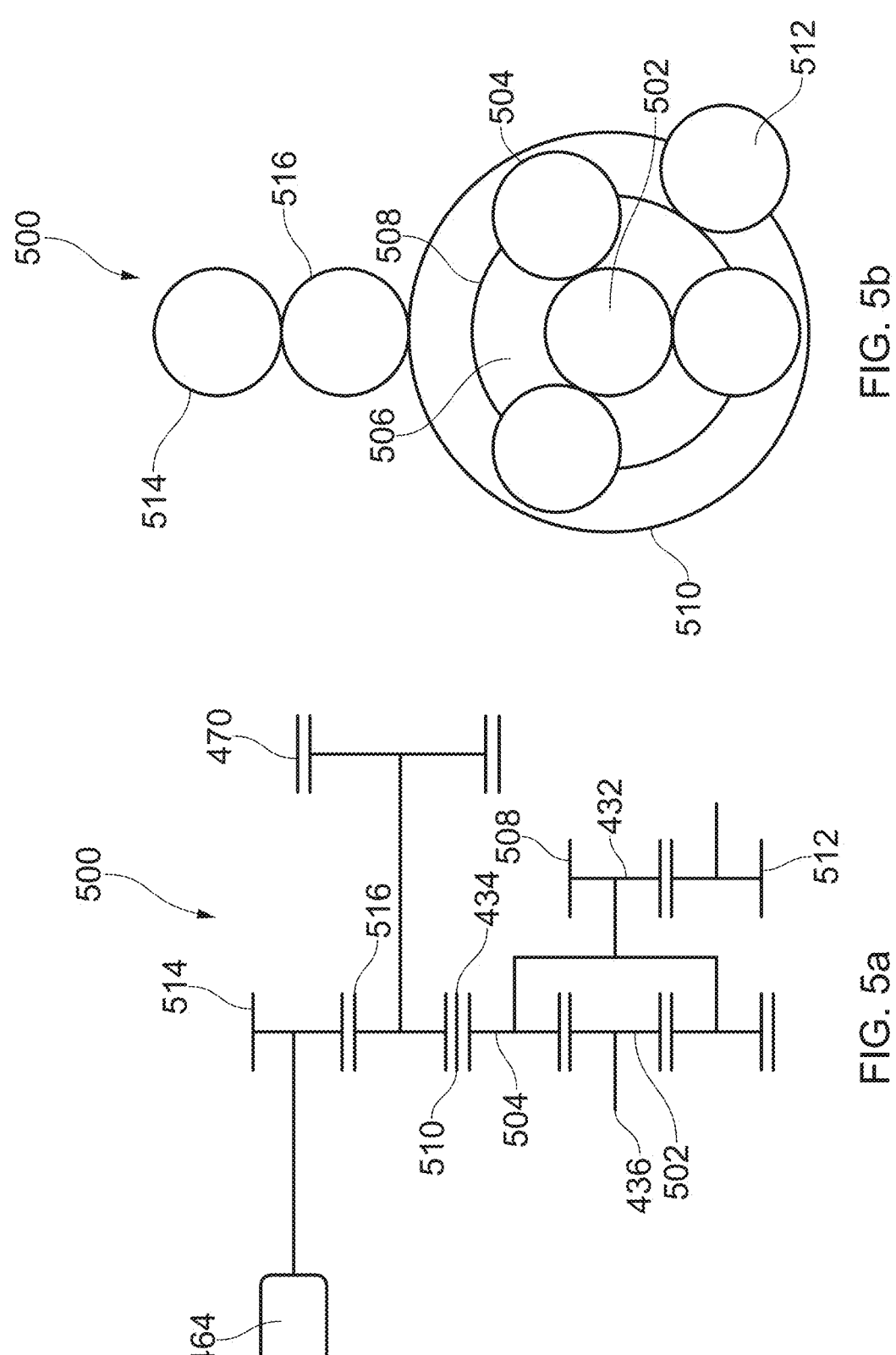
FIG. 5a is a schematic cross-sectional view of a transmission for the air pressurisation system shown in FIG. 4, according to arrangements of the present disclosure.
FIG. 5b is a front view of a transmission for the air pressurisation system shown in FIG. 4 according to arrangements of the present disclosure.

With reference to FIGS. 5a and 5b, a variable transmission 500 according to arrangements of the present disclosure will now be described. The variable transmission 500 may be provided as part of the air pressurisation system 400, e.g. in place of the variable transmission 430. The variable transmission comprises a differential epicyclic transmission having a sun gear 502, a plurality of planet gears 504 meshingly engaged with the sun gear 502 and supported about the sun gear by a carrier 506. A carrier gear 508 may be formed on the carrier for rotation together with the planet gears 504 about the sun gear 502. A ring gear 510 is disposed about the planet gears 504 meshingly engaged with the planet gears. Each of the sun gear 502, planet gears 504, carrier gear 508 and ring gear 510 comprise teeth to inter-mesh with the other gears. However, for clarity the teeth are not illustrated in FIGS. 5a and 5b. Furthermore, in FIG. 5b there are three planet gears 504 illustrated, although it will be apparent to the skilled reader that more or fewer planet gears 504 may be provided within the scope of the claimed invention.

In the arrangement illustrated in FIGS. 5a and 5b, the blower compressor 420, e.g. a rotor of the blower compres-sor, is operatively coupleable to the sun gear 502 for rotation together with the sun gear 502, the spool 440 is operatively couplable to the carrier gear 508, e.g. via the accessory gear box 445 and/or a spool spur gear 512 meshingly engaged with the carrier gear 508, and the second electrical machine 464 is operatively coupled to the ring gear 510. For example, the second electrical machine 464 may be coupled to the ring gear via a variator spur gear 514. Accordingly, the output 436 of the variable transmission 500 is formed by the sun gear 502, the first input 432 may be formed by the carrier gear 508 and the second input 434 may be formed by the ring gear 510.

Figure 6B:
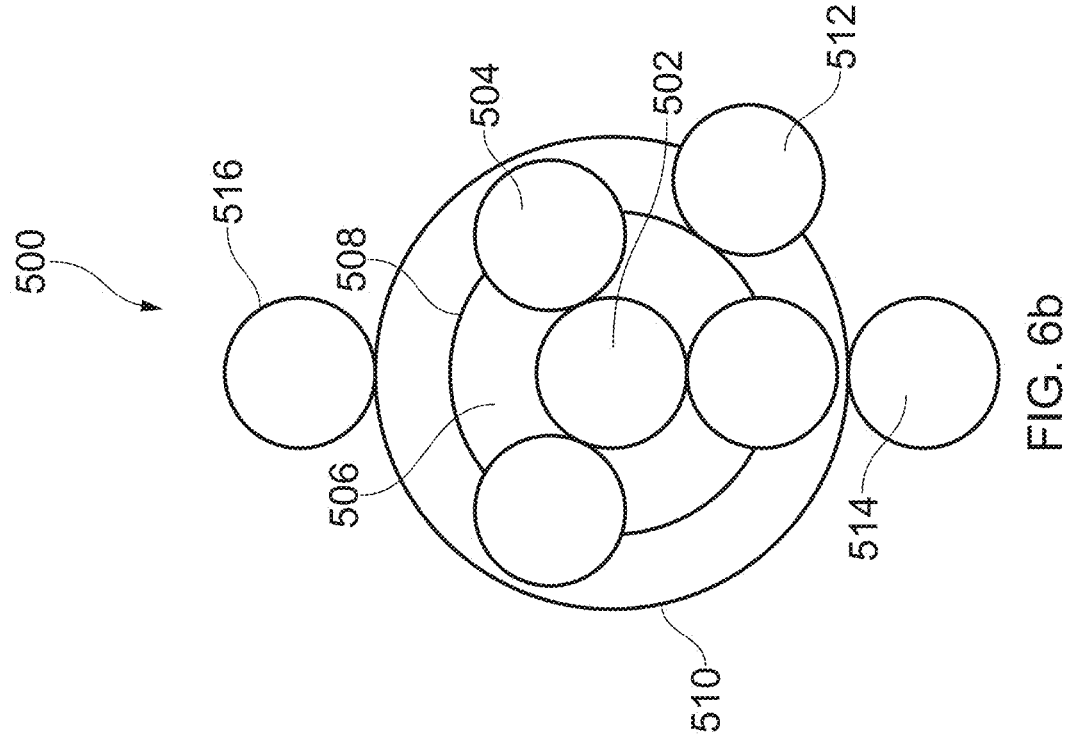
FIG. 6b is a front view of another transmission for the air pressurisation system shown in FIG. 4 according to arrangements of the present disclosure.
Figure 6A:
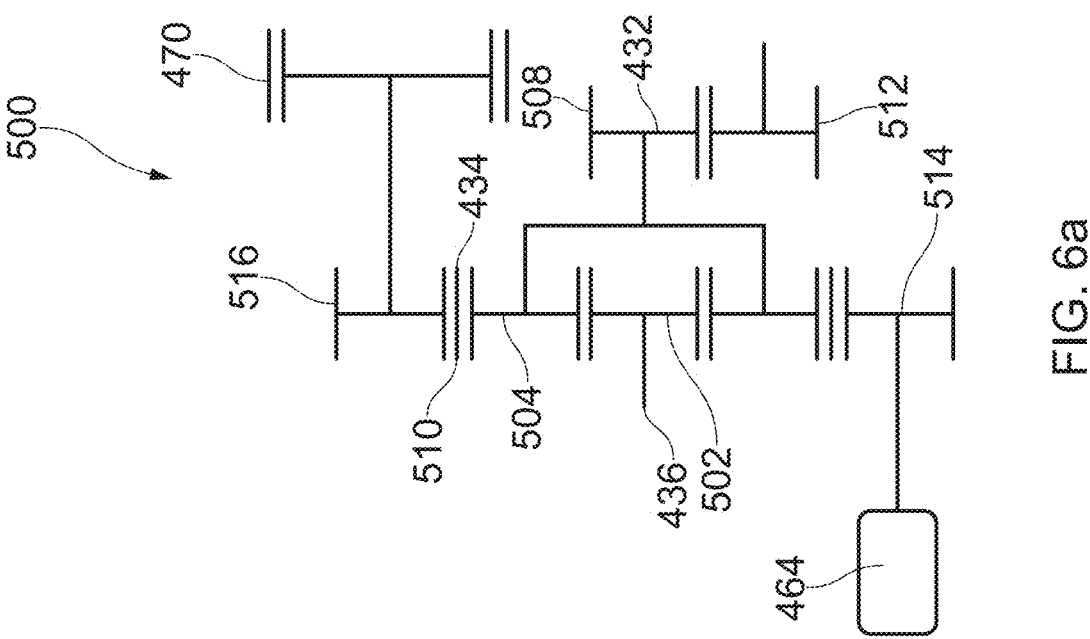
FIG. 6a is a schematic cross-sectional view of another transmission for the air pressurisation system shown in FIG. 4, according to arrangements of the present disclosure.

As illustrated, the brake 470 may be operatively coupled to the variable transmission 500 at the ring gear 510. In particular, the brake 470 may be coupled to the ring gear via a brake spur gear 516 meshingly engaged with the ring gear. As depicted in FIG. 5a, the brake spur gear 516 maybe directly connected, e.g. meshed, with the ring gear 510, and the variator spur gear 514 may be connected to the ring gear 510 via the brake spur gear 516. In other words, the variator spur gear 514 may be meshingly engaged with the brake spur gear 516. However, in other arrangements, such as that depicted in FIGS. 6a and 6b, both the variator spur gear 514 and the brake spur gear 416 may be meshingly engaged, e.g. directly, with the ring gear.

As depicted in FIGS. 5a, 5b, 6a and 6b, the variator spur gear 514 and the brake spur gear 516 may be meshingly engaged with teeth formed on an outside, e.g. a radially outer surface, of the ring gear 510. In other arrangements, either or both of the variator spur gear 514 and the brake spur gear 516 may be meshingly engaged with teeth formed on an inside, e.g. a radially inner surface, of the ring gear 510. In some arrangements, the ring gear may be a stepped gear and the variator spur gear 514 and either or both of the brake spur gear 516 may be meshingly engaged with teeth formed on a different step of the ring gear 510 from the planet gears 504 and/or one another. The different step of the ring gear may have a different number of, e.g. fewer or more, teeth than the step of the ring gear with which the planet gears 504 are meshingly engaged.

Figures 7A, 7B:
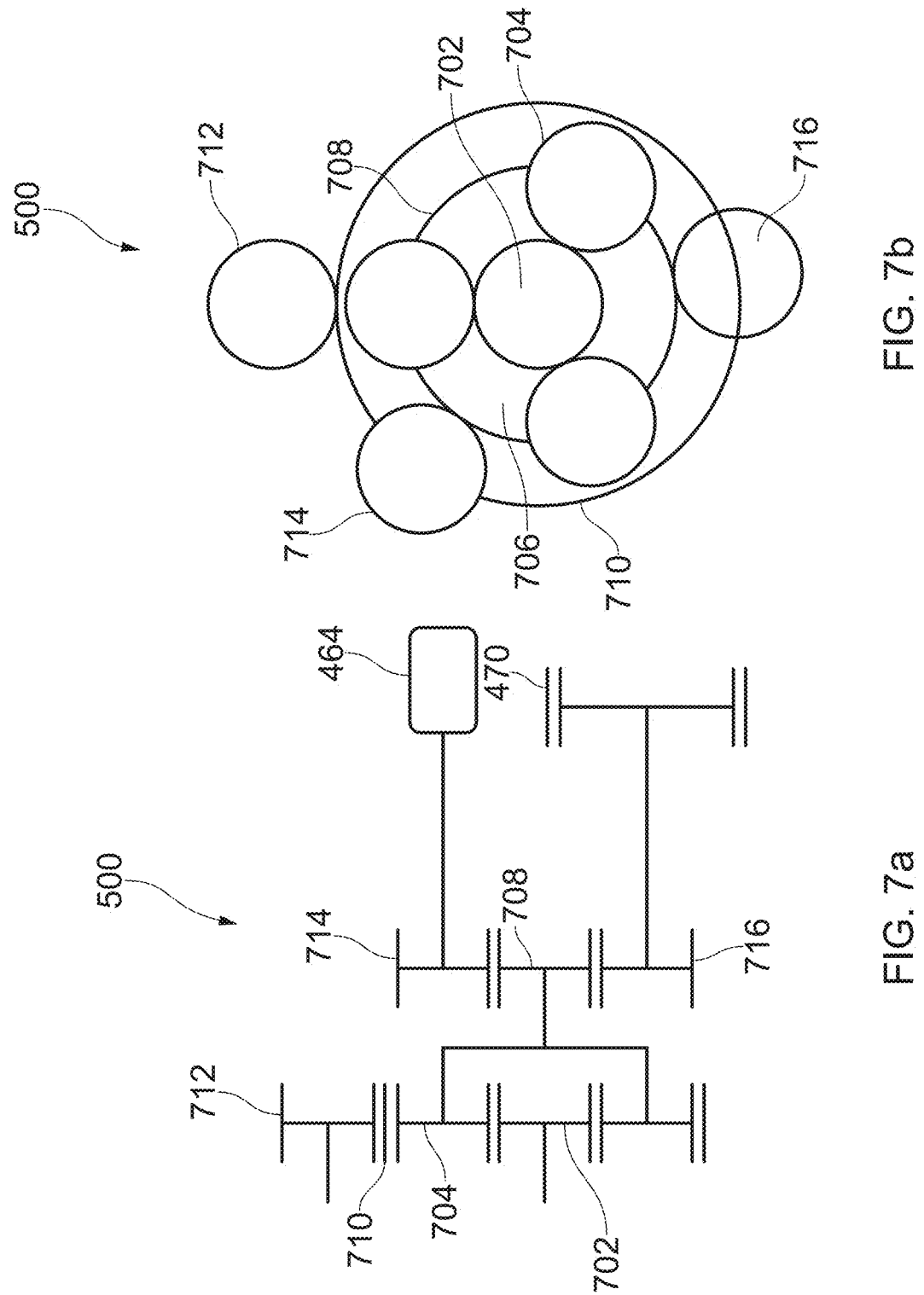
FIG. 7a is a schematic cross-sectional view of another transmission for the air pressurisation system shown in FIG. 4, according to arrangements of the present disclosure.
FIG. 7b is a front view of another transmission for the air pressurisation system shown in FIG. 4 according to arrangements of the present disclosure.

FIGS. 7a and 7b depict an alternative arrangement of variable transmission 700, which may be provided as part of the air pressurisation system 400, e.g. in place of the variable transmission 430, instead of the variable transmission 500. The variable transmission 700 may be similar to the variable transmission 500 and features described in relation to the variable transmission 500 may apply equally to the variable transmission 700. In particular, the variable transmission 700 may comprise a sun gear 702, a plurality of planet gears 704 meshingly engaged with the sun gear 702 and supported about the sun gear by a carrier 706. A carrier gear 708 may be formed on the carrier for rotation together with the planet gears 704 about the sun gear 702. A ring gear 710 is disposed about the planet gears 704 meshingly engaged with the planet gears. The variable transmission 700 differ from the variable transmission 500, in that the spool 440 is coupleable to the ring gear 710 of the variable transmission 700, and the brake 470 and second electrical machine 464 are coupleable to the carrier gear 708 of the variable transmission 700. As depicted, a spool spur gear 712 is meshingly engaged with the ring gear 710, and a variator spur gear 714 and brake spur gear 716 are meshingly engaged with the carrier gear 708.

As depicted, the variator spur gear 714 and the brake spur gear 716 may be meshingly engaged with teeth formed on an outside, e.g. a radially outer surface, of the carrier gear 708. In other arrangements, either or both of the variator spur gear 714 and the brake spur gear 716 may be meshingly engaged with teeth formed on an inside, e.g. a radially inner surface, of the carrier gear 708. In some arrangements, the carrier gear 708 may be a stepped gear and the brake spur gear 716 may be meshingly engaged with teeth formed on a different step of the carrier gear from the variator spur gear 714. The different step of the carrier gear may be a different number of, e.g. more or fewer, that the step of the carrier at which the variator spur gear 714 is meshingly engaged with the carrier gear 708.

This disclosure contemplates that the functions described with respect of the brake controller 390, may be performed by any other controller or combination of controllers. Fur-ther, it will be appreciated that the brake controller 490 may form a part of a multifunctional controller configured to control multiple systems of the gas turbine engine 10, which may be referred to in the art as an electronic engine controller (EEC).

Figure 8:
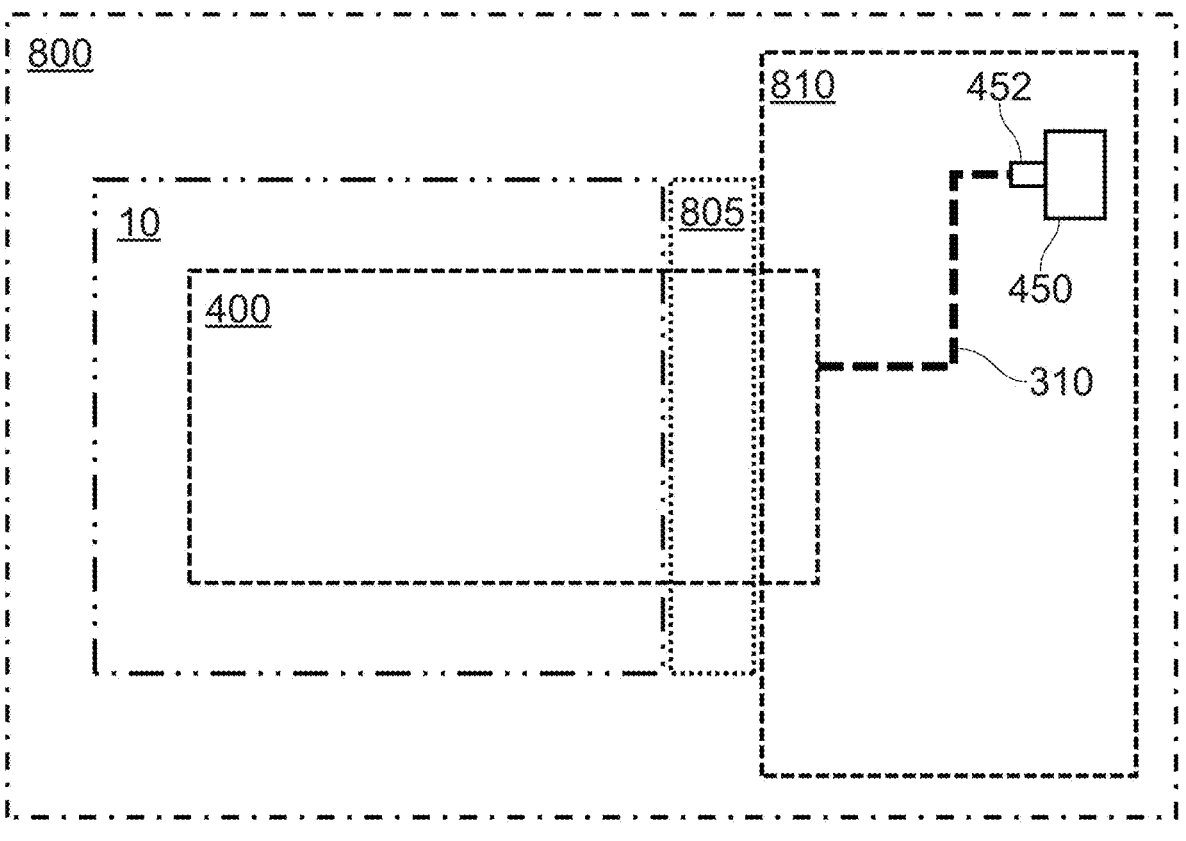
FIG. 8 is a schematic diagram of an aircraft including an airframe, a gas turbine engine and an air pressurisation system.

FIG. 8 shows a schematic view of an aircraft 800 which includes an airframe 810, a gas turbine engine 10, a pylon 805 and the air pressurisation system 400. The pylon 805 is configured to attach the gas turbine engine 10 to the airframe 810 (e.g., to a wing of the airframe 810), as will be appreciated by those of ordinary skill in the art. The gas turbine engine 10 may be in accordance with the gas turbine engine 10 described above with reference to FIGS. 1 to 3. The air pressurisation system 400 may have any suitable combination of the features described above with respect to the air pressurisation systems 400, 500, 700 described above. The air pressurisation system 400 may be at least partially disposed within the gas turbine engine 10, at least partially disposed within the pylon 805 and/or at least partially disposed within the airframe 810. For instance, the blower compressor 420 may be disposed within the gas turbine engine 10. The airframe 810 comprises the airframe system 450 to which the airframe port 452 is configured to supply conditioned and compressed (i.e., pressurised) air from the air pressurisation system 400.

It will be understood that the invention is not limited to the embodiments above-described and various modifications and improvements can be made without departing from the concepts described herein. Except where mutually exclu-sive, any of the features may be employed separately or in combination with any other features and the disclosure extends to and includes all combinations and sub-combina-tions of one or more features described herein. The scope of protection is defined by the appended claims.

The invention claimed is:

1. An air pressurisation system for an aircraft, the air pressurisation system comprising:
   a transmission for driving a rotor of a blower compressor for the air pressurisation system, wherein the transmis-sion comprises:
   a first input configured to receive drive from a spool of a gas turbine engine;
   a second input; and an output configured to drive the rotor of the blower compressor, wherein a speed of the output is determined by a function of speeds of the first and second inputs; and a brake coupled to the second input, wherein the brake is operable to engage and brake the transmission at the second input, in order to fix a transmission ratio of the transmission between the first input and the output.

2. The air pressurisation system of claim 1, wherein the brake is selectively operable to brake the transmission at the second input.

3. The air pressurisation system of claim 1, wherein the brake is configured to engage and brake the transmission at the second input when a speed of the transmission at the second input exceeds a predetermined threshold speed.

4. The air pressurisation system of claim 3, wherein the brake is configured to disengage, so that the second input is not braked by the brake when a speed of the transmission at the second input reduces below a further predetermined threshold speed.

5. The air pressurisation system of claim 1, wherein the transmission comprises a differential epicyclic transmission, wherein the first input is operatively coupled to one of a ring gear and a carrier of the differential epicyclic transmission, the second input is operatively coupled to the other of the ring gear and the carrier, and the output is operatively coupled to a sun gear of the differential epicyclic transmission.

6. The air pressurisation system of claim 5, wherein the other of the ring gear and the carrier comprises a gear that meshes with a stepped gear and wherein the brake is meshingly engaged with a step of the stepped gear having a fewer number of teeth than the other step.

7. The air pressurisation system of claim 1, wherein the system further comprises an electrical machine, wherein a shaft of the electrical machine is operatively coupled to the second input.

8. The air pressurisation system of claim 7, wherein the system further comprises an electrical power management system configured to control a speed of the shaft of the electrical machine.

9. The air pressurisation system of claim 8, wherein the system further comprises a further electrical machine, wherein a shaft of the further electrical machine is drivingly coupled with the spool of the gas turbine engine and wherein the further electrical machine is electrically coupled to the electrical power management system.

10. The air pressurisation system of claim 9, wherein the system further comprises a controller configured to identify a fault in the further electrical machine, wherein the controller is configured to operate the brake to engage and brake the transmission at the second input, when a fault is identified in the further electrical machine.

11. The air pressurisation system of claim 1, wherein the system is configured to operate in a starter mode, in which the transmission is configured to receive drive from the rotor of the blower compressor at the output and supply drive to the spool of the gas turbine engine via the first input, wherein when operating in the starter mode, the brake is configured to engage in order to fix a transmission ratio of the transmission.

12. The air pressurisation system of claim 1, wherein the brake is selectively operable to disengage from the second input, so that the second input is not braked by the brake.

13. The air pressurisation system of claim 1, wherein the system further comprises a further brake coupled to the second input, wherein the further brake is operable to engage and brake the transmission at the second input, in order to fix a transmission ratio of the transmission between the first input and the output.

14. The air pressurisation system of claim 13, wherein the brake is configured to engage and brake the transmission at the second input when a speed of the transmission at the second input exceeds a predetermined threshold speed, and wherein the further brake is selectively operable to brake the transmission at the second input.

15. A gas turbine engine comprising the air pressurisation system of claim 1.

16. An aircraft comprising an airframe, a gas turbine engine and the air pressurisation system of claim 1.

* * * * *